219-121 SR

MTR04 XR 3,896,284

United States Patent [19]

Holmes

[11] 3,896,284

[45] July 22, 1975

[54] THIN-FILM MICROELECTRONIC RESISTORS

[75] Inventor: Edward S. B. Holmes, Almonte, Canada

[73] Assignee: Microsystems International Limited, Montreal, Canada

[22] Filed: Mar. 11, 1974

[21] Appl. No.: 450,076

Related U.S. Application Data

[63] Continuation of Ser. No. 261,722, June 12, 1972, abandoned.

[52] U.S. Cl. .................. 338/48; 117/71 R; 117/217; 338/308

[51] Int. Cl. .............................................. H01c 13/00

[58] Field of Search ...................... 338/48, 306–309, 338/204; 117/71 M, 71 R, 212, 217; 29/620, 610, 621

[56] References Cited

UNITED STATES PATENTS

| | | | |
|---|---|---|---|
| 3,240,602 | 3/1966 | Johnston | 338/307 X |
| 3,296,574 | 1/1967 | Tassara | 338/309 |
| 3,377,697 | 4/1968 | Hobbs | 338/328 X |

*Primary Examiner*—C. L. Albritton
*Attorney, Agent, or Firm*—Sidney T. Jelly

[57] ABSTRACT

The present invention relates to a number of layers of resistive materials superimposed upon an area of the substrate, the material of highest resistivity being deposited first, and therefore at the bottom of the stack, and the remaining layers being deposited in decreasing order of resistivity. Thereafter the layers are selectively trimmed to give required values.

2 Claims, 3 Drawing Figures

THIN-FILM MICROELECTRONIC RESISTORS

This is a continuation of application Ser. No. 261,722, filed June 12, 1972, now abandoned.

The present invention relates to thin-film microelectronic resistors.

One disadvantage of thin-film technology has been the relatively narrow range of resistors than can be made on a single substrate or circuit. This is because conventionally, a single resistivity film is deposited for resistor fabrication, such film subsequently being trimmed to give the desired resistor value. Clearly, the range of resistances available by trimming is limited to a large extent by chip geometry and density and the resistivity of the material.

It has been proposed to sputter different resistive materials onto different areas of a substrate for the purpose of providing a wide range of resistors. However, this method is relatively uneconomical in that it requires masking off a number of areas of the substrate, requiring excessive handling and restricting layout flexibility of the entire circuit.

According to the present invention, a number of layers of resistive materials are superimposed upon an area of the substrate, the material of highest resistivity being deposited first, and therefore at the bottom of the stack, and the remaining layers being deposited in decreasing order of resistivity. Thereafter the layers are selectively trimmed to give required values.

Figure 1:
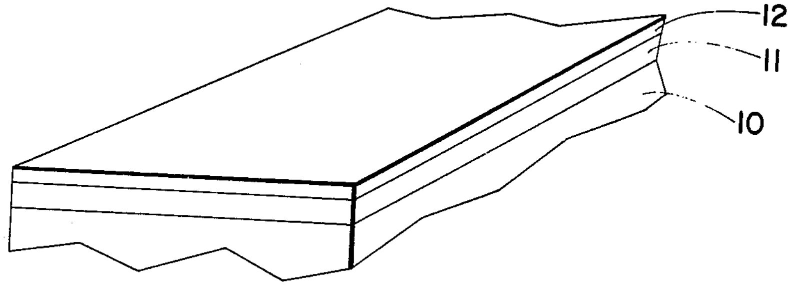
Figure 2:
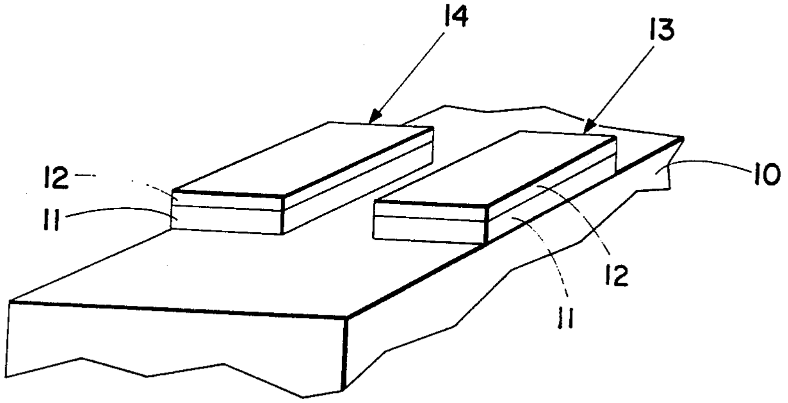
Figure 3:
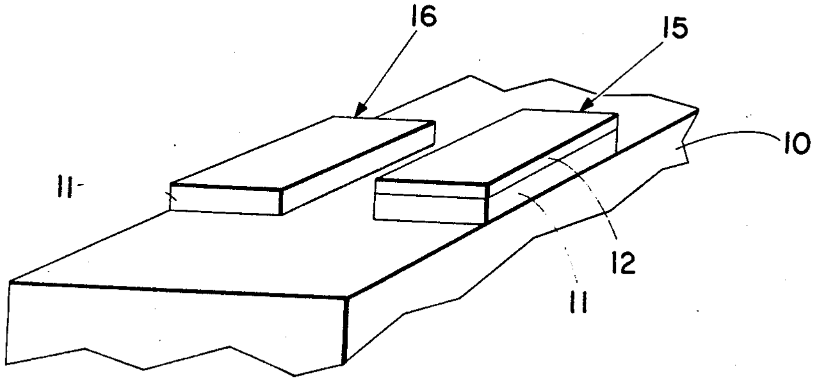

The invention will now be described further by way of example only and with reference to the accompanying drawings in which:

FIGS. 1 to 3 are perspective views of various stages of fabrication of a stacked resistor according to the present invention.

Referring now to the drawings, FIGS. 1 to 3 inclusive show steps in the fabrication of a device according to the invention.

FIG. 1 shows a substrate member 10 over which is deposited a layer 11 of material of first resistivity. A second layer 12 of material of second resistivity is deposited over the layer 11.

In FIG. 2, the layers 11 and 12 are shown etched away to leave islands designated generally by the reference numerals 13 and 14. These islands form the sites of the resistive elements 15 and 16 respectively being formed.

In FIG. 3, the layer 12 of second resistivity material is etched away from the island 14, leaving the layer 11 exposed - the material of the island 13 being masked and left intact. Contact pads are now formed over opposite ends of each resistive element 15 and 16 using masking or etching techniques well-known in the art. As an alternative, contact pads may be deposited upon the substrate member 10, prior to resistive layer deposition, and the layers deposited between the pads.

Now, it will be realized that if the sheet resistivity of the first layer 11 is $S_1$ ohms/square and the sheet resistivity of the second layer 12 is $S_2$ ohms/square, since only the layer 11 is left on the island 14, the sheet resistivity of this layer is $S_1$ ohms/square. However, for the island 13, the layers 11 and 12 are effectively in parallel, and therefore the sheet resistivity S of the total resistive element is given by the expressions $1/S = 1/S_1 + 1/S_2$. A consideration of this relationship will reveal that for practical purposes, the layers must be deposited in decreasing order of resistivity. For example, suppose $S_2 = 10$ ohms/square and $S_1 = 1000$ ohms/square. The resistive element 16 would have a sheet resistivity of 10 ohms/square (layer 11 only) and the resistive element 15 would have a sheet resistivity S calculated as follows:

$$1/S = 1/10 + 1/1000$$

Therefore, $S = 9.8$ ohms/square. Hence, there is very little difference in sheet resistivity between the resistive elements, and if a sheet resistivity of 1000 ohms/square is required, the only way of achieving such value would be to remove the bottom layer 12 in the element 15. This is clearly impractical.

If now $S_1 = 10$ ohms/square and $S_2 = 1000$ ohms/-square, the sheet resistivity of the element 16 would be 1000 ohms/square and for the element 15, the sheet resistivity $S$ is again 9.8 ohms/square.

Now, we have the required choice of sheet resistivities between the value of 10 ohms/square (approximately) and 1000 ohms/square.

In the process described in FIGs. 1 to 3 inclusive, the following is an example of materials and fabrication techniques which may advantageously be employed.

The substrate 10 is 99.7% alumina ceramic with a 5 micro inch surface finish, prepared by standard thin film cleaning technique. The clean substrate has chromium evaporated thereon to give the layer 11, having suitable sheet resistivity for high value resistance of approximately 500 – 1000 ohms/square. Following this step the substrate is baked within the confines of a sputtering machine and then the layer 12 is formed by sputtering tantalum on top of the chromium to yield a sheet resistivity suitable for low value resistors (approximately 5 – 10 ohms/square).

The bi-metal layer is then photo-etched to leave the islands 13 and 14 of FIG. 2 and the tantalum layer 12 is removed by etching from the island 14 to expose the high-resistivity chromium layer 11. The gold contact pads with a nichrome keying layer are then evaporated through a mask onto the top resistor layer. The resistor is finally trimmed either functionally or to value using a laser, by anodizing, or both.

Whatever materials are used, the etchant used to remove the top layer must be inert to the layer immediately below. In the above examples, an $HF/HNO_3/$-$CH_3COOH$ mixture is used since this does not attack chromium, although the etchant employed is a matter of choice with the skills of one versed in the art.

In the examples given above, a process for forming two resistors - i.e. the resistors 15 and 16 of FIG. 3 - has been described. Such example is chosen to illustrate the relationship between a stacked resistor 15 according to the present invention and a single-layer resistor 16 made by the described process. Clearly, the presence of the resistor 16 is in no way associated with or effective upon the efficacy of the stacked resistor 15 and the method of fabrication described above is clearly applicable to the fabrication of the resistor 15 alone.

As a variation of the chromium/tantalum system described above, nichrome may be used as the high resistivity layer instead of chromium. In this case, the sheet resistivity of the nichrome would be 100–200 ohms/-square. However, after etching the tantalum from the nichrome, the etchant specified above would attack the nickel phase of the nichrome and the chromium phase would increase proportionately, giving a resistor typically having 500–1000 ohms/square sheet resistivity.

To avoid this degradation of the nichrome, the tantalum must be removed by anodizing or some other method which will not attack the nichrome.

Thus, it will be realized from the foregoing that numerous combinations of resistive materials may be chosen to give the desired resistances and that such materials may be deposited up to any number of layers, providing that the order of such deposition is in decreasing order of resistivity and that layers may be removed without damage to underlying layers.

As stated above, in connection with a two layer system, the total sheet resistivity R of a resistor element fabrication in this manner is calculated from:

$$1/S = 1/S_1 + 1/S_2$$

wherein $S_1$ and $S_2$ are the sheet resistivities of the superimposed layers. For $n$ layers, $$1/S = 1/S_1 + 1/S_2 + 1/S_n$$

wherein $S_n$ is the sheet resistivity of the $n$th layer.

Also, the top layer of any element may be trimmed either alone or in conjunction with the lower layers to give precise resistance adjustments. Clearly, as the upper layer is trimmed to a progressively higher resistance value, the underlying layers carry progressively more of the current through the element, unless these are also trimmed at a corresponding resistance increase rate. This gives an extremely flexible resistance system.

A further advantage of the method described above is the ease with which it may be extended to fabricate thin-film capacitors upon the same substrate. Considering, for example, the situation where the multi-layer resistor comprises tantalum upon chromium or nichrome. As the resistor is being etched, the same two-layer stack can simultaneously be etched out in another area to form a capacitor. Now, the surface of the tantalum of this second area can readily be anodized to a controlled depth in order to give a tantalum pentoxide dielectric for the subsequently formed capacitor. The bottom conductor for the capacitor already exists in the form of the bottom layer - either chrome or nichrome - and the unoxidized tantalum. All that is now required is a top conductor, which may readily be deposited upon the surface of the tantalum pentoxide dielectric simultaneously with deposition of the resistor contacts.

Various further embodiments and modifications of the invention will be readily apparent to those skilled in the art without departing from the spirit and scope of the invention as described herein and as defined in the claims appended hereto.

What is claimed is:

1. A multi-layer resistor assembly comprising a substrate member having two layers of electrically conductive material thereupon extending between terminal means for said resistor, the first layer, adjacent said substrate, being comprised of chromium, and the second layer, of decreased resistivity with respect to the first layer, being comprised of tantalum.

2. A multi-layer resistor assembly comprising a substrate member having two layers of electrically conductive material thereupon extending between terminal means for said resistor, the first layer, adjacent said substrate, being comprised of nichrome, and the second layer, of decreased resistivity with respect to the first layer, being comprised of tantalum.

* * * * *